Oct. 28, 1941.　　F. L. O'BRIEN ET AL　　2,260,862
METHOD OF AND APPARATUS FOR PREPARING FACSIMILE MASTER COPIES
Filed July 12, 1939　　3 Sheets-Sheet 2
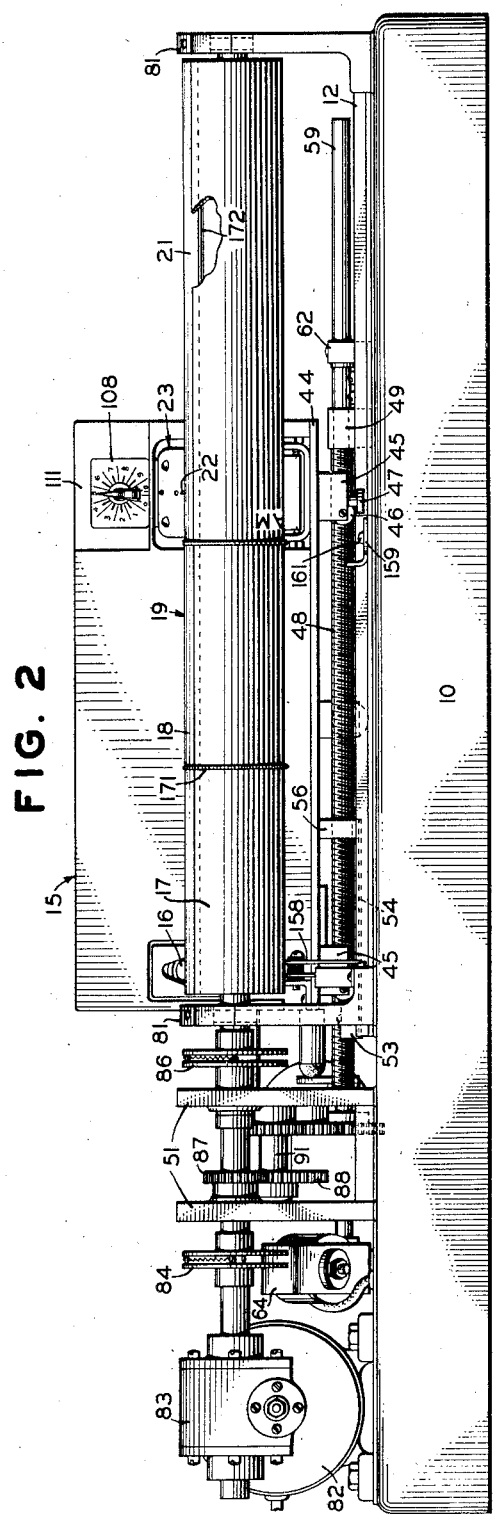
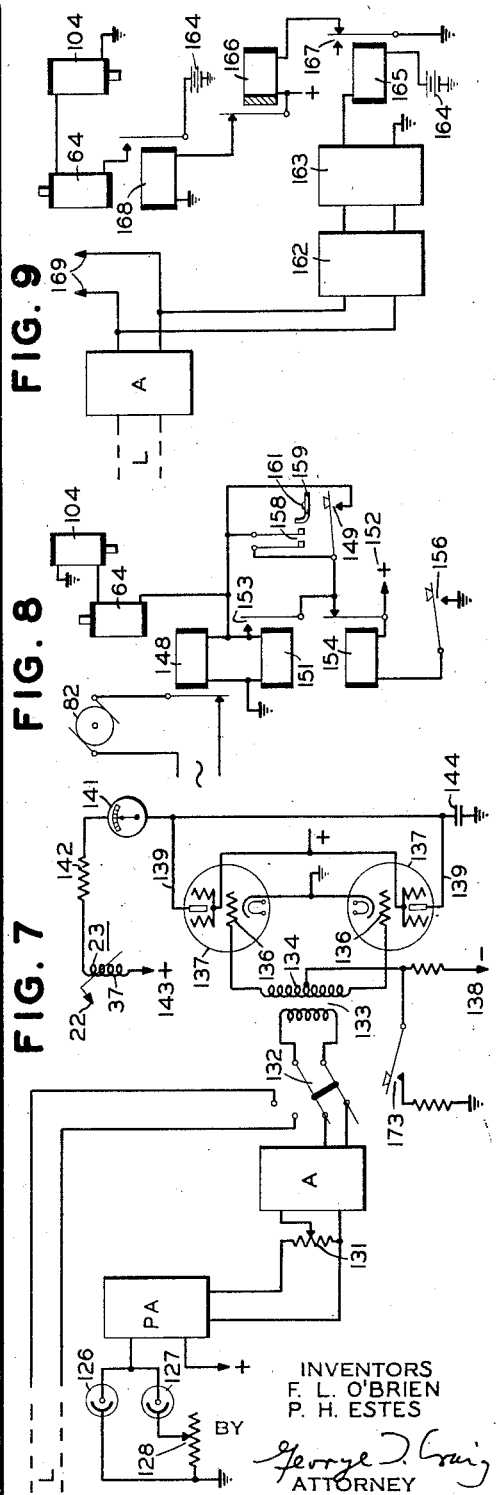
INVENTORS
F. L. O'BRIEN
P. H. ESTES
BY George J. Craig
ATTORNEY Oct. 28, 1941.   F. L. O'BRIEN ET AL   2,260,862
METHOD OF AND APPARATUS FOR PREPARING FACSIMILE MASTER COPIES
Filed July 12, 1939   3 Sheets-Sheet 3

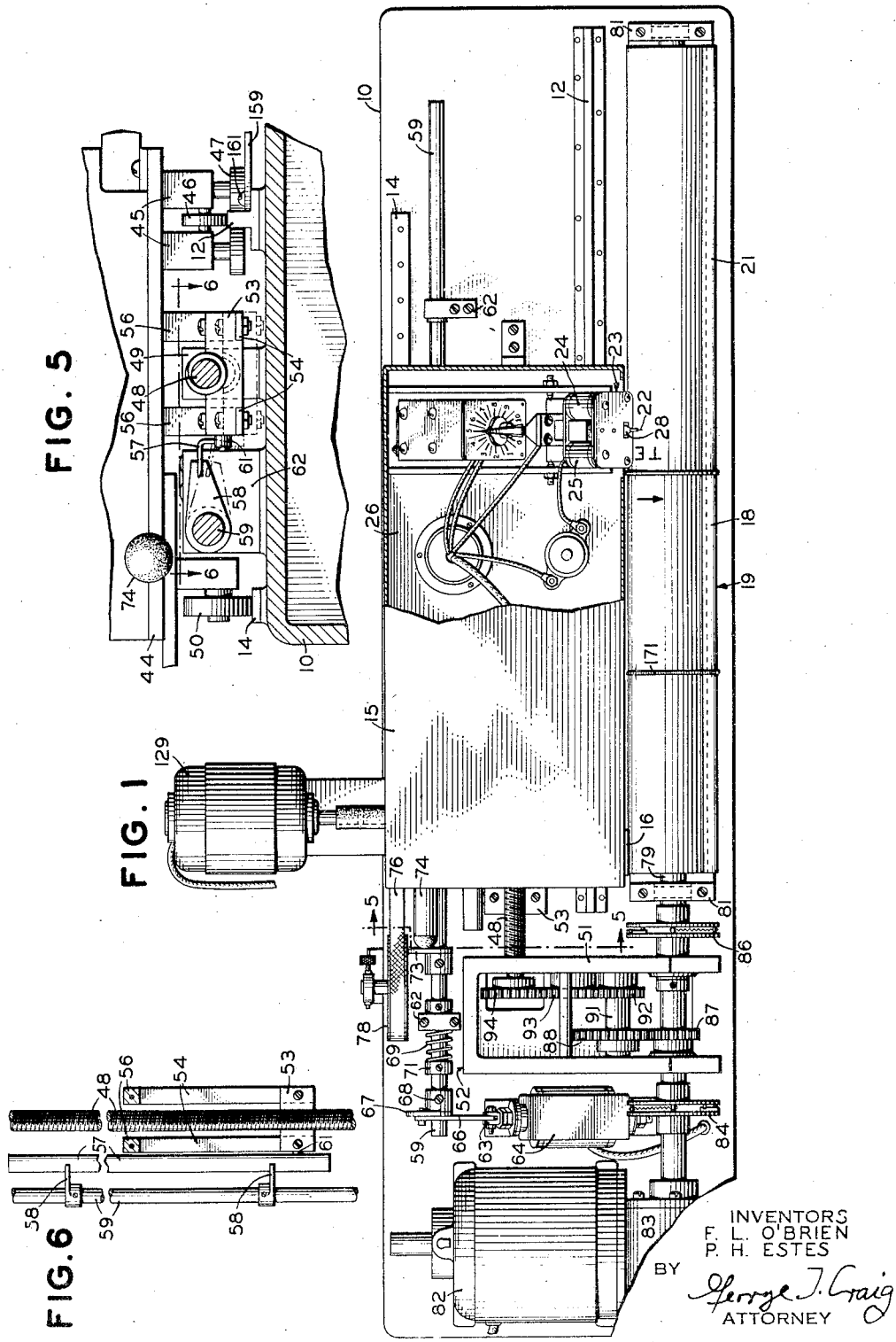

INVENTORS
F. L. O'BRIEN
P. H. ESTES
BY
George J. Craig
ATTORNEY

Patented Oct. 28, 1941

2,260,862

UNITED STATES PATENT OFFICE 2,260,862

METHOD OF AND APPARATUS FOR PREPARING FACSIMILE MASTER COPIES

Frederic L. O'Brien and Phillip H. Estes, Rutherford, N. J., assignors to The Western Union Telegraph Company, New York, N. Y., a corporation of New York Application July 12, 1939, Serial No. 283,954

12 Claims. (Cl. 178—6.6)

The present invention relates to methods of and apparatus for reproducing copies of pictures, drawings and other subject matter, and more particularly to a novel means for preparing a master copy of an original from which numerous copies may be made by the mimeograph, hectograph or other process.

Prior art systems for the cutting of stencils electrically relied upon punching or cutting a series of dots in a sheet of ordinary paper. Useful stencils giving clear copies could not be obtained by practicing the methods disclosed in connection with these old systems because a perforated stencil sheet in a mimeograph machine will permit too copious a flow of ink through the perforations onto the copy. The resulting copy is therefore blurred in that it lacks clean-cut definition. Other difficulties arose in practicing previous methods for making mimeograph stencils on an electrical recorder because of the lack of a proper tool for impressing the record in the stencil. Hectograph copies for use in a hectograph duplicator when made by prior art methods also lacked proper detail and heretofore a sheet suitable for use in a hectograph machine to reproduce the fine detail of an original could not be obtained.

An important object of the present invention, therefore, is to provide novel methods of and apparatus for making a facsimile copy of an original capable of further reproduction by known transfer or printing methods, the reproduction having greater detail and clearness of definition than similar reproductions from facsimile copies obtained by prior art methods.

Still another object of the present invention is to provide novel means for rendering stencil material pervious to ink in local areas of definitely controllable extent.

A further object of the present invention is to provide a novel method of obtaining equalization of the operating current for a pressure or percussion recording unit regardless of variation in marking signal input value.

Still another object of the present invention is to provide novel means for determining the minimum input signal which will operate a recorder unit.

In accordance with the present invention a sheet of stencil material having a wax-like coating or impregnation is marked with a stylus of novel form substantially without disturbing or destroying the fibrous nature of the stencil sheet. Also, the invention is especially useful for making a copy suitable for reproduction by the hectograph process.

More specific objects of the invention defined by the terms of the appended claims in addition to the broad objects set forth above will be apparent from the following description taken in connection with the accompanying drawings, in which:

Fig. 1 is a top plan view of a copying apparatus for drawings and other subject matter embodying the present invention;

Fig. 2 is a view in front elevation of the device disclosed in Fig. 1;

Fig. 5 is a fragmentary view taken in section on line 5—5 of Fig. 1;

Fig. 6 is a fragmentary rear view sectioned on line 6—6 of Fig. 5;

Fig. 7 illustrates diagrammatically the electrical features of the machine disclosed in Figs. 1 and 2 of the drawings;

Fig. 8 illustrates diagrammatically the control features of the machine of Figs. 1 and 2; and Fig. 9 is a diagrammatic showing of the electrical features of a modification.

Figure 3:
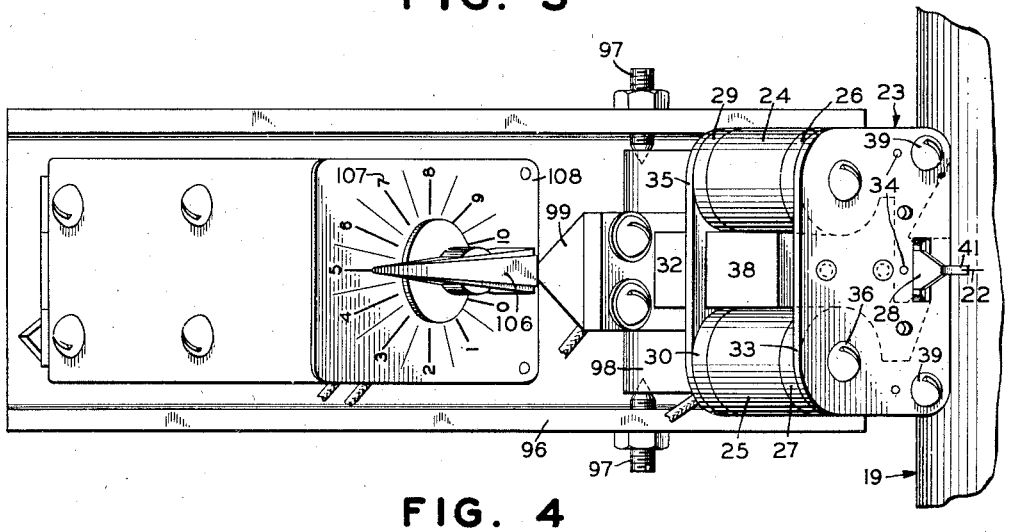
Fig. 3 is a top plan view to an enlarged scale of the recording unit and its mounting.

Referring to the drawings and for the present to Figs. 1 to 4 thereof, 10 indicates a base which forms the principal support for the apparatus and the driving mechanism thereof and which is adapted to rest upon an apparatus table or other convenient support. The base 10 is provided with guide rails 12 and 14 serving slidably to support the longitudinally movable scanning assembly 15 which comprises an optical pickup system indicated at 16 for deriving signals from an original 17 secured upon the portion 18 of the copy holder which is indicated in its entirety by the reference character 19. The copy holder 19 includes the portion 21 adapted to support a blank which is acted upon mechanically by the stylus 22 of a recording unit 23 shown in detail in Figs. 3 and 4.

Referring to these figures, the recording unit 23 comprises cylindrical permanent magnets 24 and 25, one of which is inverted with respect to the other, so that they are of opposite polarity. A pair of laminated pole pieces 26 and 27, shaped as shown in dotted outline in Fig. 3, overlap the free end of the armature 28. A second pair of laminated pole pieces 29 and 30, similar in outline to pole pieces 26 and 27 but reversed in position, extend from the lower ends of the magnets 24 and 25 to overlap the armature adjacent its connection at 31 to the block 32. The upper pole pieces are secured to a non-magnetic plate 33 by rivets 34 and the lower set of pole pieces are secured in a similar manner to a non-magnetic plate 35. The top and bottom plates 33 and 35, including their respective pole pieces, are clamped to the permanent magnets by means of bolts 36 one of which is passed through each of the magnets.

A coil 37 surrounds the armature 28 and is held in position in a recess of a plastic insulating member 38, the latter being roughly of T-shape with the stem of the T located between the magnets. Two screws 39 extending through each of the non-magnetic plates 33 and 35 are threaded into the member 38 and serve to secure it in position.

The stylus 22 preferably consists of a U-shaped piece of wire soldered, welded, or otherwise secured to the bent portion 41 of the armature 28. The stylus may, if desired, be formed by shaping the downturned end 41 of the armature so that it will be similar in configuration to the wire stylus 22 illustrated in the drawings. As a further modification of the stylus, a separate piece of metal may be formed by grinding, or any other known metal working operation, to a shape which approximates that of the illustrated stylus. This separate piece of metal can then be secured to the armature 28 as by welding or soldering.

The resonant vibrational frequency of the armature 28 is preferably higher than the highest electrical frequency impressed on the coil 37. It will be understood by those versed in the art that the maximum modulation frequency derived from the pickup device 15 will be determined by the speed of the drum 19 and the nature of the original being scanned for reproduction. For example, if the drum is rotated at 80 R. P. M., the unit 23 is preferably designed so that the resonant frequency of the armature when vibrating freely is 800 cycles per second or more. With the unit in operative position with respect to the drum 19, the resonant frequency drops to 650 cycles per second which is still of a value great enough to prevent the stylus from rebounding to such an extent as to affect the quality or appearance of the record.

The scanning assembly 16 and the recording unit 23 are mounted upon a suitable base member 44, the latter being provided with a suitable number of front guide blocks 45 having rollers 46 and 47 which cooperate with the top and sides respectively of the front guide rail 12. The base member 44 is supported on the top of the rear guide rail 14 by means of a roller 50 (Fig. 5). Movement in one direction is imparted to the base member 44 by means of a rotatably mounted threaded rod 48 which is journaled adjacent one end in a bearing 49, the other end of the rod being journaled in an aperture formed in the wall 51 of a gear enclosure 52. A half nut member 53 having an arcuate threaded recess is pressed upwardly into contact with the threaded member 48 by a pair of elongated spring members 54 which are secured at 56 to the base 44.

The half nut 53 may be depressed to withdraw it from operative engagement with the threaded shaft 48 by an angle bar 57 fastened to bracket 58, the latter being secured to the rock shaft 59 as best shown by Fig. 5. A roller 61 is journaled on the half nut to cooperate with the angle bar 57 thereby minimizing friction between the parts. The rock shaft is journaled in stationary bearing members 62 upstanding from the base 10. The shaft 59 is rocked to depress the angle bar 57 and consequently the half nut 53 by the core 63 of a solenoid 64. The core 63, which moves inwardly when the solenoid is energized, is connected by a link 66 to a crank 67 adjustably secured on the shaft 59 by a set screw 68. One end of a torsion spring 69 is connected to the shaft 59 at 71, the other end being secured to the bearing member 62 whereby to assist in engaging the half nut.

A suitable member 73 is adjustably secured for convenience on the shaft 59 in the path of a bumper 74 which projects from the base member 44. A tensioned cable 76 is attached to the base member 44 and serves to return it to the left when the solenoid 64 depresses the angle member 57 to release the half nut 53. The cable 76 may be tensioned by any suitable weight or spring device, for example by a spring reel 78 such as is used to exert tension on a typewriter carriage.

The cylinder driving shaft 79, rotatably supported in bearing members 81, is driven from the motor 82 through a speed reducing drive 83 of suitable character and the flexible couplings 84 and 86. The threaded shaft 48 is driven at the proper speed with respect to the shaft 79 by means of a gear train comprising the driving pinion 87 which meshes with the gear 88. The gear 88 is secured to an intermediate shaft 91 which carries a pinion 92, meshing with the idler 93 which in turn drives the gear 94 secured to the shaft 48. The gear ratios of the gearing just described and the pitch of the thread on the shaft 48 are selected so that the rate of longitudinal travel of the base member 44 and the peripheral speed of rotation of the cylinder 19 cooperate to produce the desired helical scanning of the subject matter on the portion 18 of the cylinder. Excellent results are secured in practice by selecting these relative speeds so that as the cylinder rotates once, the scanning assembly will move longitudinally a distance of a hundredth of an inch. It will be understood that in the preferred form of the apparatus for general use, the cylinder 19 will be of equal diameter throughout.

If desired the portion 21 of the cylinder 19 may differ in diameter from the portion 18 when the machine is designed to receive subject matter sheets of a certain size for reproduction and standard size stencil sheets on the portion 21. Slight differences in diameter result in a very slight distortion of the recorded copy in one dimension, which, however, is not appreciable.

Figure 4:
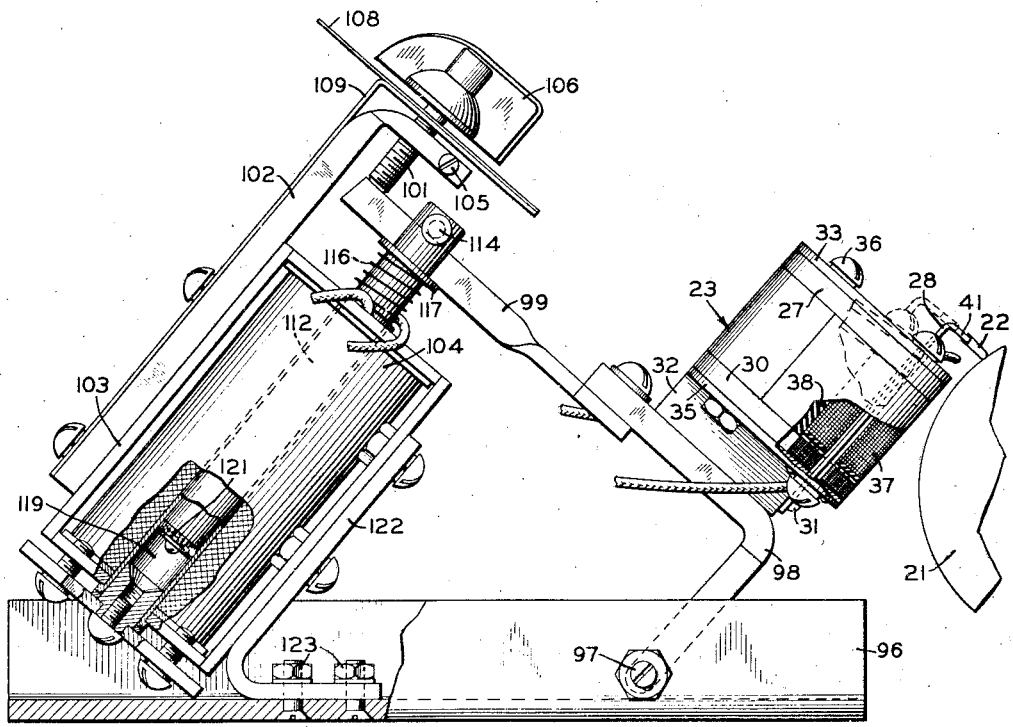
Fig. 4 is a view in side elevation of the mounting disclosed in Fig. 3.

The recording unit 23 is supported upon the base plate 44 in a manner most clearly shown by Figs. 3 and 4 of the drawings. Referring to these figures, a channel-shaped subplate 96 is secured in any suitable manner to the base plate 46. Upstanding flanges of the channel-shaped member are provided with trunnion screws 97 which pivotally support an angle-shaped bracket 98 upon which the recording unit 23 is secured by means of block 32 of the latter. The bracket 98 has an extension 99 secured thereon which is adapted to engage the end of a stop screw 101 threaded into a stationary member 102, the screw adjustably fixing the position of the stylus 22 with respect to the surface of the recording drum 21. The stationary member 102 in the illustrative embodiment is secured to the frame or shell 103 of a solenoid magnet 104. The portion of the member 102 which carries the screw 101 is slotted and apertured to receive the screw 105 the latter preventing loss of adjustment. The head of the screw 101 is provided with a knob or thumb piece 106 cooperating with graduations 107 on a stationary plate 108. The stationary index plate 108 may be mounted as shown in Fig. 4 on a bracket 109 secured to the member 102. In a preferred arrangement, the index 107 is provided on a sloping portion of the cover 111 which houses the scanning assembly 15 and the unit 23.

Readily obtainable mimeograph stencil sheets are approximately .002 of an inch thick, and when the unit 23 is to be used for recording on one of these sheets, the screw 101 is set so that the tip of the stylus is spaced approximately .004 of an inch from the surface of the sheet. In general the setting of the screw 101 is such that the wax, which coats the fibrous structure of the sheet, is pressed or plowed away to make the fibrous structure pervious to mimeograph ink without destroying its original form. For this reason a mimeograph ink of lower viscosity can be used.

Hectographic carbon paper plus the white paper underneath has a thickness of approximately .005 of an inch. For recording with carbon paper of this thickness, the tip of the stylus 22 is spaced approximately .009 of an inch away from the surface of the drum 21 when the magnet 37 is deenergized.

The recording unit 23 is moved from its operative position with respect to the copyholding cylinder 21 by means of the core 112 of the solenoid magnet 104. The solenoid core 112 is slotted to receive the bracket extension 99 and is provided with a pin or roller 114 constraining the extension 99 to move when the solenoid core 112 is drawn inwardly. A compression spring 116 positioned between the end of the solenoid 104 and a washer 117 which is free to move on the core 112, assists in moving the recording unit 23 to its operative position when the solenoid is deenergized. The spring 116 is shorter than the distance between the extension 99 and the end of the solenoid when the unit is in operative position whereby the solenoid is relieved of the necessity for overcoming the force of the spring in the first part of its travel. The weight of the recording unit 23 and the force of the spring 116 are opposed by the action of a dash-pot chamber 119 at the end of the core 112 which serves as a plunger by reason of the packing 121. The dash-pot 119 insures lowering of the stylus 22 gently upon the recording cylinder. The entire assembly comprising the solenoid 104 is carried upon a bracket 122 secured by suitable fastening means 123 to the channel member 96.

Fig. 7 of the drawings illustrates diagrammatically the electrical system employed in connection with the apparatus disclosed in Figs. 1 to 4 of the drawings. The photoelectric pickup device 16 is similar to that disclosed in an application of R. J. Wise, et al., Serial Number 110,760 filed November 13, 1936, now Patent No. 2,255,868, issued Sept. 16, 1941, and comprises a pair of photocells 126 and 127, the former receiving modulated light from the original to be reproduced and the latter being continuously illuminated by a source of steady light and having a variable resistance 128 for adjustment. The alternating current output derived from the photocells by the use of a light chopper driven from the motor 129 Fig. 1 is amplified by a pre-amplifier PA and an additional amplifier A. A volume control 131 is interposed between these two amplifiers for the purpose of adjusting the amplitude of the signals which are fed to the recording unit.

The output of the amplifier A is fed by way of a double pole switch 132 to the primary of a transformer 133. When the recorder is to be used for receiving signals from a remote point over the line L the switch 132 will be thrown upwardly to connect the line to the primary of the transformer 133.

The secondary 134 of this transformer is connected to the grids 136 of a pair of similar electronic devices 137. The midpoint of the secondary 134 is connected to a suitable source of negative biasing potential 138. The electronic devices 137 preferably have a high amplification factor and a large mutual conductivity. The type 48 or the type 616 tube are examples of vacuum tubes suitable for the purpose. The anodes 139 of the electronic devices 137 are connected to one end of the coil 37 of the recording device in series with a milliammeter 141 and a higher resistance 142. The remaining end of the coil 37 is connected to a suitable source of positive potential 143. The series circuit which includes the high resistance 142 and the coil 37 of the recording unit is by-passed by a condenser 144.

The resistance 142 and the condenser 144 cooperate to limit the maximum power output from the electronic devices 137 so as to prevent the stylus 22 from exerting an excessive pressure on the recording medium. The resistance and condenser cooperate to cause the anode voltage on the electronic devices 137 to drop to a low value when a certain input level is reached thus holding the anode current constant for higher values of input. The stylus pressure is therefore uniform for the duration of a signal regardless of its intensity. It is also necessary that the anode current change from the full steady state to zero be accomplished within a relative small input level change. The large amplification factor and the large value of mutual conductance of the electronic devices mentioned above assist in obtaining this result, the relatively large value of biasing voltage which is applied to the electronic devices, as hereinafter set forth, also assisting in effecting the desired result.

Fig. 8 illustrates the electrical system which is employed for placing the recording unit in operation and controlling the movements of the base plate 44 which carries the scanning assembly 15 of the recording unit 23. The carriage return solenoid 64 and the recording unit retracting solenoid 104 of Figs. 1 and 3 respectively are indicated by the same reference characters in Fig. 8 of the drawings. The apparatus is shown in Fig. 8 with the relay tongues in the position occupied when the machine is in operation. The relay 148, which controls the supply of current to the motor 82, is deenergized and the solenoids 64 and 104 are also deenergized so that the split nut engages the lead screw 48 and the recording unit is in its operative position. When scanning of a given drawing or other piece of subject matter is completed, the stop key 149 is momentarily depressed which energizes the relays 148 and 151 from the current source indicated by reference character 152. The relay 151 is locked through its front contact 153 over a circuit including the source 152 and the tongue and back contact of the relay 154. At this time the solenoids 64 and 104 are energized from the source 152 over a circuit including the tongue and back contact of the relay 154 and the front contact 153 of the relay 151. The relay 148 is also maintained in an energized condition from the locking contact 153 and interrupts the supply of current to the motor 82. When the apparatus is to be placed in operation the start key 156 is momentarily depressed which energizes the coil of the relay 154 from the source 152 thereby interrupting the previously described locking circuit for the relay 151. When this occurs the relay 148 and the solenoids 64 and 104 are deenergized thus placing the machine in operation. In the event that the machine is not stopped by the stop key 155 after a given piece of subject matter has been scanned, it will be automatically stopped by closure of a pair of contacts 158 carried by the base member 44 and are positioned to engage a stop member 159. The latter is secured to the base 10 in an adjustable manner by a screw 161 engaged in a slot in the horizontal leg thereof.

The machine may be operated by signals from a distant point transmitted over the line L, as pointed out above, and when this is done the control apparatus disclosed in Fig. 9 is preferably employed so that complete automatic operation by remote control may be obtained. Referring to Fig. 9 the apparatus disclosed therein is similar to that illustrated in Fig. 3 of the copending application above referred to and comprises a filter 162 which feeds into an amplifier or detector 163. The output of the detector is connected to its anode current supply source 164 through a relay 165. A slow to release relay 166 is controlled through the tongue and back contact 167 of the relay 165. The relay 166 controls energization of a relay 168 which energizes the solenoids 64 and 104 to interrupt operation of the machine as previously described. The incoming signals from the line L are amplified in an amplifier A if necessary and are applied by way of the terminals 169 to the terminals marked L of Fig. 7 to operate the recording unit, the switch 132 shown in Fig. 7 being placed in its upper position.

In operation of the control apparatus disclosed in Fig. 9 it will be understood that the remote transmitter, which in this instance is supplying signals to the recording unit 23, is equipped with means for impressing on the line L a steady tone of predetermined frequency when transmission of a given piece of subject matter has been completed. This tone will be passed by the tuner 162 and upon detection by the device 163 will energize the relay 165 causing it to deenergize the relay 166. The circuit of the operating coil of the relay 168 is thus closed at the tongue and back contact of the relay 166. This energizes the solenoids 64 and 104 from the source 164 by way of the tongue and contact of the relay 168, thereby raising the recording unit from the recording surface and returning the carriage to its initial position. When transmission is to be resumed the tone previously referred to ceases and the relay 166 is energized which deenergizes the relay 168 in turn deenergizing the solenoids 64 and 104, causing the receiver to resume transmission. It will be understood that phasing is to be accomplished preferably in the manner disclosed in the above referred to copending application and that the motor 82 will be supplied from a source of current which is of substantially the same frequency as the current which drives the transmitting apparatus.

In operation of the complete machine described in the foregoing, a drawing or other piece of subject matter from which more or less numerous copies are to be made is secured upon the portion 18 of the cylinder 19 by means of a rolling annular spring 171 in the manner described in the R. J. Wise et al. patent above referred to. It will be assumed that the machine is ready for operation as described in connection with Fig. 8 of the drawings, the relay 148 being energized to stop the motor and the solenoids 64 and 104 being energized to withdraw the half nut from engagement with the lead screw and to raise the recording unit 23 from recording position respectively. In the event that mimeograph copies of the drawings are desired, a stencil sheet is applied to the portion 21 of the drum 19. Excellent results are obtained in practice by using a stencil sheet of the type disclosed in Patent No. 1,526,982. In general, any stencil sheet made for typewriter service can be used. This coated sheet, which is a standard article of commerce, adheres firmly to the portion 21 of the drum so that no fastening means are needed to secure it in place. Good results can also be secured by interposing a soft, thin tissue between the stencil and the drum. The backing for the stencil still has the firmness necessary for recording and the tissue sheet absorbs the coating material from the stencil sheet at the point of stylus pressure. Inasmuch as the subject matter to be reproduced and the stencil sheet are secured on a common drum no synchronization problem is presented and a faithful copy in exact register will be produced on the stencil sheet as scanning proceeds provided that the original and the stencil sheet are placed upon the drum with their top or bottom edges coinciding with a line 172 which is engraved or otherwise suitably marked upon the drum 19 throughout its length.

The photoelectric pickup device 16 is now balanced on a selected portion of the original by closing the switch 173 (Fig. 7) and manipulating the control 128 which is connected to the balancing photocell 127. Correct balance is indicated by a minimum deflection of the milliammeter 141. The switch 173 is necessary because the electronic devices 137 are heavily biased negatively for class C operation and if this bias is not reduced in some manner the small output from the photoelectric pickup device when it is nearly balanced will not be indicated by the milliammeter 141. A refinement of the foregoing procedure may be had by directing the beam which is projected into the photocell 126, upon the lightest portion of the original which is to be reproduced, for example a pencil mark and adjusting amplifier control so that the stylus just marks. With this setting anything lighter in shade than the portion of the original selected for the balancing operation will not operate the stylus 22 of the recorder.

Inversion of the picture by the balancing photocell 127 is unnecessary if the stylus carrying armature 28 of the recording unit is biased to cause the stylus to exert pressure on the recording sheet when the winding 37 is deenergized. When the photocell 126 is scanning the background, the signal is maximum, causing energizing current to flow in the winding 137 in a direction to withdraw the stylus 22 from the recording surface.

As previously explained the maximum pressure with which the stylus 22 is pressed against the recording surface is limited by the resistance 142 in combination with the condenser 144 and therefore even when the blackest part of the original is scanned the stylus 22 will not exert an excessive pressure on the recording surface. The adjustment of the pickup by balancing it on a selected portion of a given shade on the original in conjunction with the resistance and condenser combination provides a definite working range between light and heavy marks on the original which is desirable because of the "mark" and "no-mark" characteristic of the coated stencil sheet, that is, a minimum threshold value of stylus marking action at any desired density of shade on the original.

When the original has been copied the stop button 149 is closed momentarily which stops the machine in the manner explained above. In the event that the machine is not stopped by manipulation of the stop button 149, the switch 158 will be closed in the manner previously explained to stop the machine and thereby prevent damage by over-travel.

Assuming that a visible record is to be made upon the surface of an ordinary sheet of paper by means of carbon paper, the ordinary paper is placed on the drum 21 in contact therewith and the uncoated side of the carbon paper is exposed to the action of the stylus 22. It is preferable to load the machine in such a manner that the record sheet does not overlap but the carbon paper is overlapped at its edges. With hectograph carbon a new original or "master sheet" will be produced which can be used in a duplicator machine for reproducing numerous copies of the original subject matter.

It is possible to obtain variably shaded pictures using carbon paper having a hard coating thereon. For obtaining the variable shading it is necessary to get proportionality between the stylus pressure and the intensity of coloring of the picture or other subject matter on the original. This is done by reducing the value of the resistance 142 in series with the unit 22 or by removing it entirely.

The mode of operation of the modification illustrated diagrammatically in Fig. 9 of the drawings is believed to be obvious in view of the foregoing. This arrangement as previously stated provides for automatic operation of the recorder after the desired recording medium is applied to the portion 18 of the cylinder 19.

It will be seen from the foregoing that the invention just described provides a novel and efficient arrangement for producing copies of an original each of which may be used for obtaining numerous additional copies therefrom.

While the invention has been described and explained in detail in connection with an illustrated embodiment thereof, it is to be understood that the invention may be embodied in other forms and therefore the invention is not limited except as indicated by the terms and scope of the appended claims.

We claim:

1. The method of producing a master copy of a picture, drawing, or other subject matter, comprising the derivation of electrical variations from said subject matter, causing the electrical variations to control the operations of a copying instrumentality, causing the copying instrumentality to contact the record sheet in accordance with said variations only when the signal level of said variations equals or exceeds a predetermined minimum value, and limiting the maximum pressure exerted by said instrumentality on said record sheet notwithstanding that the signal level of said variations exceeds a predetermined maximum value.

2. The method of producing a reproducible copy of a picture, drawing, or other subject matter, comprising the derivation of electrical variations, limiting production of the variations to given tones or shades of the subject matter, causing said variations to control a copying instrumentality to contact the reproducible record sheet solely in accordance with the duration of variations having a signal level equal to or in excess of a predetermined minimum value, and limiting the maximum pressure exerted by said instrumentality on said record sheet notwithstanding that the signal level of said variations exceeds a predetermined maximum value.

3. In a facsimile recorder, in combination, a recording unit, a copyholder adapted to support a record sheet for cooperation with said recording unit, means to provide a scanning movement of said unit with respect to said copyholder, a support, a member pivotally mounted on said support and carrying said unit, a solenoid having a plunger secured to said support, a connection between said plunger and said pivotally mounted member whereby to withdraw said unit from cooperative engagement with said record surface, switch means operable at will, and other switch means automatically operable under predetermined conditions, for energizing said solenoid to cause said withdrawal of the recording unit from cooperative engagement with the record surface, and adjustable means to fix the position of said unit with respect to said record sheet.

4. In apparatus for producing a copy of a picture, drawing, or other subject matter, a copyholding cylinder, a scanning device comprising pickup and recording means movable longitudinally of said cylinder, a threaded member, means to rotate said threaded member and said cylinder at different speeds, a member having a threaded concave recess resiliently secured to said scanning device and adapted to engage said threaded member to provide line feed of the pickup and recording means, means for releasing said recessed member from engagement with said threaded member at any time, and an electromagnet mounted in a fixed position with respect to said device for controlling the operation of said last named means.

5. In combination, a record sheet, a firm backing for said sheet, a recording member, means comprising a magnet to cause said member to exert pressure on said sheet for recording purposes, a source of signals for said magnet, and means interposed between said source and said magnet to prevent operation of the magnet until the amplitude of said signals equals or exceeds a predetermined minimum value and to limit the pressure of said member on said sheet to a predetermined maximum notwithstanding that the amplitude of said signals exceeds a predetermined maximum value.

6. The method of producing a master facsimile copy on a printing sheet, of a picture, drawing, or other subject matter to be reproduced, which comprises deriving electrical variations from said subject matter, causing said electrical variations to control the operation of a facsimile recording stylus, causing the recording stylus operatively to engage the printing sheet in accordance with said variations only when the signal level of said variations equals or exceeds a predetermined minimum value, and limiting the maximum pressure exerted by said stylus on said printing sheet to a value which substantially prevents undesired deformation of or injury to said printing sheet notwithstanding that the signal level of said derived electrical variations may exceed a predetermined maximum value.

7. The method of producing a master facsimile copy on a flexible fibrous printing sheet embodying a marking substance, of a picture, drawing, or other subject matter to be reproduced, which comprises deriving electrical variations from said subject matter, causing said electrical variations to control the operation of a facsimile recording stylus, causing the recording stylus operatively to engage the flexible printing sheet to deform the marking substance in accordance with said variations only when the signal level of said variations equals or exceeds a predetermined minimum value, and limiting the maximum pressure exerted by said stylus on said printing sheet to a value which substantially prevents undesired deformation of or injury to the fibrous structure of said printing sheet notwithstanding that the signal level of said derived electrical variations may exceed a predetermined maximum value.

8. Apparatus for producing a master facsimile copy on a printing sheet, of a picture, drawing, or other subject matter to be reproduced, comprising scanning means for deriving electrical variations from said subject matter, a facsimile copying instrumentality including a recording stylus, means responsive to said electrical variations for controlling the operation of said recording stylus and to cause it operatively to engage the printing sheet in accordance with said variations only when the signal level of said variations equals or exceeds a predetermined minimum value, and means for limiting the maximum pressure exerted by said stylus on said printing sheet to a value which substantially prevents undesired deformation of or injury to said printing sheet notwithstanding that the signal level of said derived electrical variations may exceed a predetermined maximum value.

9. Apparatus for producing a master facsimile copy on a printing sheet, of a picture, drawing, or other subject matter to be reproduced, comprising scanning means for deriving electrical variations from said subject matter, a facsimile copying instrumentality including a recording stylus, means responsive to said electrical variations for controlling the operation of said recording stylus and to cause it operatively to engage the printing sheet in accordance with said variations only when the signal level of said variations equals or exceeds a predetermined minimum value, and means in circuit with said copying instrumentality for automatically limiting the operating current supplied to said instrumentality to limit the maximum pressure exerted by said stylus on said printing sheet to a value which substantially prevents undesired deformation of or injury to said printing sheet notwithstanding that the signal level of said derived electrical variations may exceed a predetermined maximum value.

10. Apparatus for producing in facsimile on a record sheet a copy of a picture, drawing, or other subject matter, comprising scanning means for deriving electrical variations from said subject matter, a facsimile copying instrumentality including a percussive recording stylus, means responsive to said electrical variations for controlling the operation of said recording stylus and to cause it intermittently to impact said record sheet in accordance with said variations only when the signal level of said variations equals or exceeds a predetermined minimum value, and means automatically operative to limit the maximum percussive pressure exerted by said recording stylus on said record sheet notwithstanding that the signal level of said variations exceeds a predetermined maximum value.

11. Apparatus for producing in facsimile on a record sheet a copy of a picture, drawing, or other subject matter, comprising scanning means for deriving electrical variations from said subject matter, means for limiting the production of said variations to given tones or shades of the subject matter, a facsimile copying instrumentality including a recording stylus, means responsive to said electrical variations for controlling the operation of said recording stylus and to cause it operatively to engage said record sheet in accordance with the duration of variations having a signal level equal to or in excess of a predetermined minimum value, and means automatically operative to limit the maximum pressure exerted by said recording stylus on said record sheet notwithstanding that the signal level of said variations exceeds a predetermined maximum value.

12. Apparatus for producing in facsimile on a flexible fibrous printing sheet embodying a marking substance, a copy of a picture, drawing, or other subject matter, comprising scanning means for deriving electrical variations from said subject matter, means for limiting the production of said variations to given tones or shades of the subject matter, a facsimile copying instrumentality including a recording stylus, means responsive to said electrical variations for controlling the operation of said recording stylus and to cause it operatively to engage the flexible printing sheet to deform the marking substance in accordance with the duration of variations having a signal level equal to or in excess of a predetermined minimum value, and means automatically operative to limit the maximum pressure exerted by said recording stylus on said printing sheet to a value which substantially prevents undesired deformation of or injury to the fibrous structure of the printing sheet notwithstanding that the signal level of said variations exceeds a predetermined maximum value.

FREDERIC L. O'BRIEN.
PHILLIP H. ESTES.